United States Patent [19]

Thomason et al.

[11] 4,134,544
[45] Jan. 16, 1979

[54] SOLAR HEATING SYSTEM

[76] Inventors: Harry E. Thomason; Harry J. L. Thomason, Jr., both of 609 Cedar Ave., Fort Washington, Md. 20027

[21] Appl. No.: 823,089

[22] Filed: Aug. 9, 1977

Related U.S. Application Data

[63] Continuation of Ser. No. 658,858, Feb. 18, 1976, abandoned.

[51] Int. Cl.² .................. F24D 3/00; F24J 3/02
[52] U.S. Cl. .................. 237/1 A; 126/271; 219/279; 219/341
[58] Field of Search .......... 126/270, 271, 400; 237/1 A, 8 R, 61; 236/91 F; 219/279, 509, 341, 282, 365, 378

[56] References Cited

U.S. PATENT DOCUMENTS

| | | | |
|---|---|---|---|
| 1,888,620 | 11/1932 | Clark | 126/271 |
| 2,342,211 | 2/1944 | Newton | 127/1 A |
| 2,680,968 | 9/1952 | Moseley | 126/271 |
| 3,071,665 | 1/1963 | Leupold | 236/91 A |
| 3,107,052 | 10/1963 | Garrison | 127/1 A |
| 3,910,490 | 10/1975 | Saypalia, Jr. | 126/271 |
| 3,946,944 | 3/1976 | Keyes et al. | 237/1 A |
| 3,958,755 | 5/1976 | Cleer, Jr. | 237/1 A |
| 3,977,601 | 8/1976 | Bearzi | 126/271 |
| 3,980,071 | 9/1976 | Barber, Jr. | 237/1 A |

FOREIGN PATENT DOCUMENTS 1918722  10/1970  Fed. Rep. of Germany ........... 219/341

Primary Examiner—Henry C. Yuen

[57] ABSTRACT

Solar energy warms liquid in a storage container. To warm a home or other structure or apparatus, a pump circulates liquid through radiators or other heat exchangers from storage when stored solar heat is adequate, and from a furnace when auxiliary heat is needed. Thus, the radiators are always either warm or hot, during cold weather when heat is needed. They are never cold, as with intermittent operation of conventional hot water heating systems. And, by using warm solar-heated water most of the time, a good percentage of the heat comes from free solar heat, thus saving expensive fuel. Expensive heat exchangers are not needed in the heat storage container.

Conversion from existing conventional hot water heat to solar heat is made simple and inexpensive.

5 Claims, 5 Drawing Figures

SOLAR HEATING SYSTEM

This is a continuation of application Ser. No. 658,858, filed Feb. 18, 1976, now abandoned.

BACKGROUND

For years it has been difficult to combine existing types of heat, such as hot water (hydronic), with solar heat. Complex and expensive systems have been suggested but very few have been proven. Most prior attempts used anti-corrosion and anti-freeze materials to protect heat collectors, heat exchangers, and other parts. Those experimental systems required many expensive valves, heat exchangers, pumps, and so on. Some systems used liquid under pressure, subject to spring leaks, ruin solar collectors, poison drinking water with anit-freeze, and so on. Expensive heat exchangers were necessary. Those heat exchangers lowered efficiency of the systems.

There appeared to be no way to construct a simple low-cost system. There appeared to be no way to convert existing systems to solar heat, except at very high cost, with liklihood of failure and low efficiency, and with the possibility of poisoning drinking water.

BRIEF SUMMARY

For solar heating, with backup auxiliary heat, simple liquid circuits and controls are embodied herein to warm homes, apartments, or other buildings or apparatus.

Solar heated liquid, such as rain water from the rooftop, is stored in an insulated container. An example of the simple, low-cost heat collector is that disclosed in applicants' (Thomasons') copending U.S. Pat. No. 3,989,031 issued Nov. 2, 1976. Examples of the container are those disclosed in Thomason U.S. Pat. Nos. 3,812,903 or 3,369,541.

The solar heat and auxiliary heat are preferably both under control of a single thermostat, having two sets of contacts. Set it at, say 70° F. When the home temperature drops to 70°, the circulating pump comes on, and a valve allows the pump to draw solar-warmed water from storage and send it to radiators, baseboard heaters or such to warm the home or other apparatus. If the temperature rises to, say 71°, the pump is automatically turned off. If the temperature falls to, say 68°, a second set of contacts turns the furnace on and switches the valve to circulate hot water from the furnace through the radiators. When the temperature rises to 69° the furnace is cut off automatically. The valve is switched and the pump again circulates solar-heated water to the radiators to keep, or help keep, the building warm. Yes, extreme simplicity with low cost solar heat collectors, without expensive heat exchangers, only a valve or two, and no poisonous anti-freeze or anti-corrosion materials.

IN THE DRAWING

Figure 1:
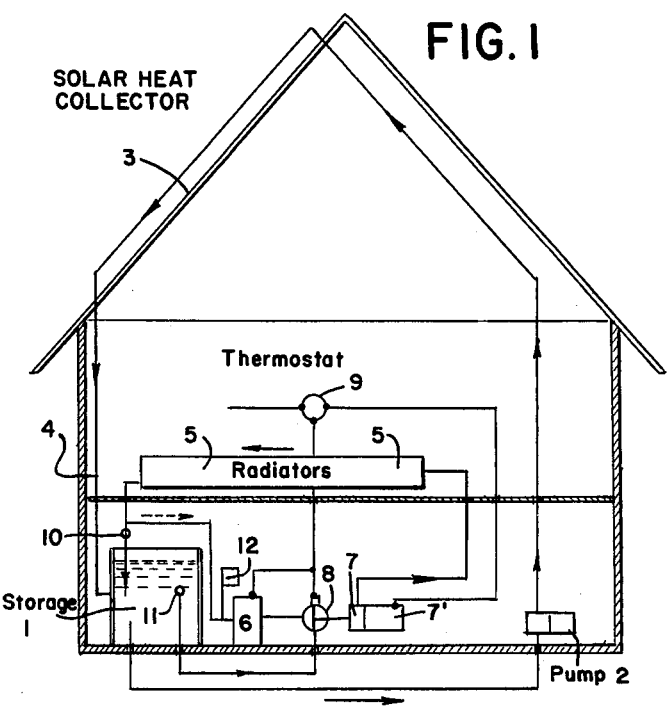
FIG. 1 is a diagram illustrating an embodiment of the invention.

Referring more specifically to the drawing, liquid is drawn from storage container 1 and sent by pump 2 to solar heat collectors 3, which act as primary heat-producing means to charge said storage container with heat. Solar-warmed water returns to storage by return line 4.

In the home, or other building or apparatus to be warmed, common heat exchange apparatus such as radiators 5 (or other heat exchangers) are warmed by heat from storage 1 or from furnace 6, using liquid circulated by pump 7, driven by motor 7'. Furnace 6 is sometimes called auxiliary or backup heat-producing apparatus. A two-way valve 8, operated by motor 8', causes pump 7 to circulate heated water from storage 1, or furnace 6, to said common heat exchange apparatus 5, as directed by thermostat 9. (Two single valves with solenoid motors could be substituted for 2-way valve 8 if desired.)

Valve 10 may be spring-loaded, normally closed. Pressure from pump 7 will open it when liquid is being drawn from storage 1 because the returning liquid has no other place to go. It will remain closed when liquid is being pumped through furnace 6 because the liquid can then flow through the path of least resistance, furnace 6. Of course, valve 10 may be motor-operated, opened by thermostat 9 when liquid is being drawn from storage 1 and closed at other times.

Check valve 11 may be employed if desired. In some installations, valves 10 and 11 (or one of them), will not be necessary. They may assist in priming the system, or in keeping an air-lock from developing in the system. An expansion tank 12 is customarily used to allow the liquid to expand as the furnace heats it.

OPERATION OF FIG. 1

For convenience of illustration, let us assume that valve 8 is spring or gravity-biased to the position illustrated in FIG. 1, that is, open for fluid communication between storage container 1 and pump 7. Thermostat 9 is set at any desired temperature, say 70° F. When the temperature in the home or other building or apparatus drops to 70°, pump 7 is turned on to circulate warm water from container 1 to radiators 5 and back to container 1. If a valve is used at 10, that valve is also opened due to pump pressure or an electrical or electronic signal from thermostat 9.

Figure 2:
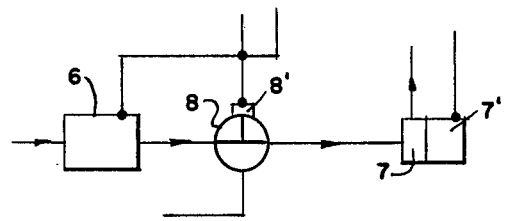
FIG. 2 illustrates an alternative position of a valve in FIG. 1.

The temperature may rise to, say 71° fairly quickly, and cut off the pump and stop the supply of solar-heated liquid. Or, it may remain steady for hours and then rise to 71° and cut off. Or, the temperature may remain steady for hours and then begin to fall slowly at, say 3:00 A.M. on a cold night. Eventually the temperature may fall to 68°. If so, thermostat 9 automatically energizes the circuit for furnace 6 and connects pump 7 to furnace 6 through valve 8, as illustrated in FIG. 2. Hot water from furnace 6 is pumped through radiators 5 and back to the furnace. (If a valve is used at 10, it may be closed. However, even if left open, or if no valve 10 is used, water returning from radiators 5 is drawn back to furnace 6 from which it was pumped, and it will be re-circulated in that loop.)

The temperature will soon rise to 69° and the furnace will be turned off. Valve 8 will return to its normal position to admit solar heated water from container 1 to pump 7, radiators 5 and back to container 1.

Figure 3:
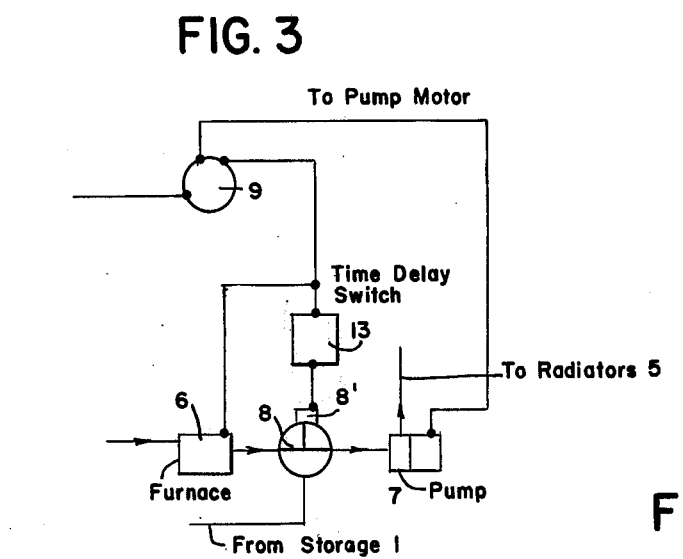
FIG. 3 illustrates a modification.
Figure 4:
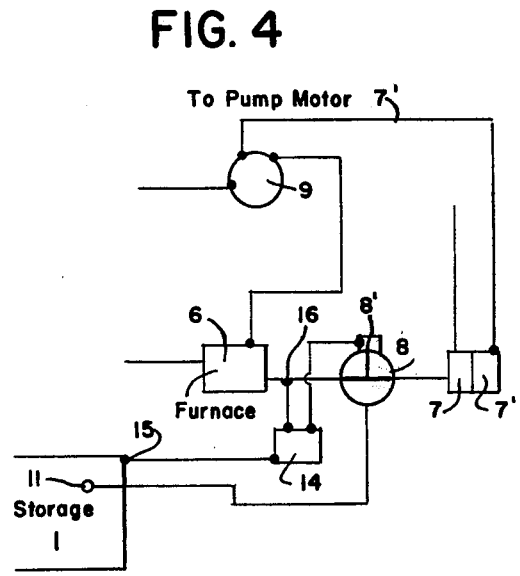
FIG. 4 illustrates another modification.

FIGS. 3 and 4

When thermostat 9 turns the furnace 6 off, the water in the furnace, pipes, radiators (baseboard heaters, convectors or other) will be hot, say 180° F. Preferably that hot water should not be circulated out of the furnace and radiators into the solar heat storage tank. Therefore, valve 8 should remain in the position connecting the furnace to the radiators until the hot water has delivered its heat to the home (or other place of usage of the heat). Suppose, for example, that heat in storage tank 1 is at 100° F. Valve 8 should remain in position connecting the furnace and radiators until the water has cooled to about 100°. That way, heat lingering in hot water in the furnace is pumped out into the home radiators and into the home, instead of going up the chimney as warm flue gases. Then, valve 8 can switch back to its position connecting pump 7 with storage tank 1 to circulate 100° water to radiators 5.

It will be understood that the solar-heated water in tank 1 may be at almost any temperature, depending on various factors such as how much the sunshine has warmed the water, how much heat has been drawn from storage at night and on cloudy days, and so on. Therefore, the storage temperature may be at 80° F., or it may be at 100°, or it may be at 125° or 150°, or other. Therefore, a device may be used to prevent switching of valve 8 until the temperatures have pretty nearly equalized. That device may be a simple time delay device 13 (FIG. 3), which costs only a few dollars. Or, it may be a little more sophisticated, such as a thermostat, not shown, that delays the switching until the water has cooled to a certain temperature (say 150°), and that type of device costs only a few dollars. Or, it may be even a little more sophisticated, such as a temperature comparing device 14 (FIG. 4), often called a differential thermostat, having a pair of sensors 15 and 16. Sensor 15 senses the temperature in storage and compares it with the temperature at sensor 16, located, for example, at the boiler or radiators. When the temperature at sensor 16 drops to approximately the temperature at sensor 15, valve 8 switches to connect pump 7 to storage tank 1. (Such a temperature-comparing switch-device is now relatively inexpensive, about $35, wholesale.)

Figure 5:
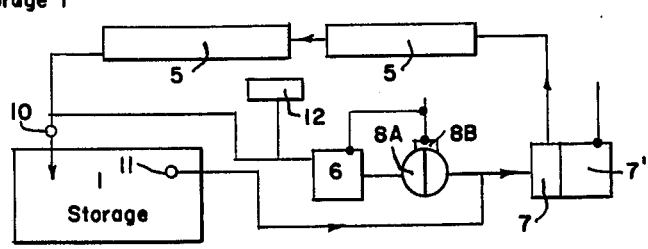
FIG. 5 illustrates another modification.

FIG. 5 carries the simple invention a step further. Instead of a two-way valve, a simple solenoid valve, or other motor-operated valve 8A is operated by motor 8B. Normally closed, valve 8A blocks flow through boiler 6. So, pump 7 draws liquid from storage 1 and sends it through radiators 5 and valve 10 back to storage 1. Valve 10 may be spring or gravity-pressed to its closed position. It will open automatically due to pressure exerted by pump 7. Valve 10 will close automatically as soon as valve 8A opens. The reason, pump 7 creates a slightly negative pressure in boiler 6, lowering the pressure at 12 and back to the return line from the radiators. Therefore, liquid returning from radiators 5 will flow to boiler 6 rather than push valve 10 open. So, when valve 8A is opened, valve 10 closes automatically. When valve 8A is closed, valve 10 is pushed open automatically by pressure from pump 7.

If desired, valve 10 may also be motor (solenoid) operated, to open when valve 8A is closed, or to close when 8A is opened.

For even further simplicity, valve 10 may be eliminated. When valve 8A is closed, pump 7 can draw liquid only from storage container 1. When that liquid returns from radiators 5 it has no place to go except back to storage 1. So, in that mode of operation the liquid is constrained to flow in one pattern only. But, when valve 8A is opened, liquid is available to the suction side of pump 7 through boiler or furnace 6 which, in turn, receives water under slight pressure. That slight pressure is due to the radiators and return line being slightly higher than storage 1 and slight pressure created by pump 7. Consequently, with valve 8A open, liquid could conceivably flow from storage 1 to pump 7, or from furnace 6 to pump 7. Given that choice, the liquid will flow through furnace 6 because it is under slight pressure from return lines at a higher elevation than storage 1.

Expansion tank 12 can be used, or can be eliminated if desired by simply substituting an overflow pipe extending up and outside of the building at a point higher than radiators 5. That serves a double function. 1. It provides a slight pressure at furnace 6, and; 2. it provides for relief of expanding water as it is being heated. Safety of the system is assured.

It will be noted that simple, low-cost apparatus, pump 7 and valve 8, circulates heating fluid in two loops or circuits. One loop is from heat storage 1 to radiators 5 and back to storage 1. The other loop is from furnace 6 to radiators 5 and back to furnace 6. Slightly more costly apparatus could be used, that is, two pumps. One could circulate heating fluid in the storage-radiator loop, the other in the furnace-radiator loop. Check valve 11 will prevent backflow through the storage loop apparatus when the furnace-loop pump is operating. Another check valve near the furnace or the furnace-loop pump will prevent backflow through the furnace when the storage-loop pump is operating. As an obvious alternative, the pumps could be well-known one-way pumps (often called positive-displacement pumps).

ENERGY SAVING FEATURE

In many normal installations the circulating pump is wired to run continuously all winter long. The thermostat fires the furnace to heat the water whenever heat is needed. Installation and service men connect them that way and point out that such operation extracts more heat from the hot furnace each time it shuts down, thereby saving fuel, and reduces repair bills by not turning the pump on and off repeatedly all winter long.

The present invention saves electrical energy for the small circulating pump 7. The thermostat shuts that pump down during mild and chilly weather when no heat is needed. And yet, during cold weather the pump may run continuously as service men recommend, so that residual heat from the hot furnace is pumped out into the home, not being allowed to waste-away up the chimney.

ELEMENTS ELIMINATED, EFFICIENCY IMPROVED

In most proposed liquid heat storage/heat recovery systems a heat exchanger is required in the hot water storage tank. Cold water from the radiators must be pumped to that heat exchanger to pick up heat from the stored heat liquid to heat the radiators. That heat exchanger is expensive. It can corrode and spring leaks, requiring replacement repeatedly as the years go by. The present invention eliminates the need for such a heat exchanger, thereby saving money for installation and for later replacement. And, very importantly, as to other proposed systems, no heat exchanger can deliver water to the radiators as hot as the liquid in storage. In other words, there is always a temperature drop across the heat exchanger. That means that "full heat" cannot be delivered to the home radiators. Efficiency of heat extraction is impaired. That means that higher temperatures are required in storage. Higher temperatures in storage mean higher temperatures for solar heat collection. And, higher temperatures in the solar heat collector mean lower collection efficiency. The result, less free heat from the sun. More of that expensive heat is required from the electric power lines, the oil companies, etc.

Many valves are required for most proposed systems. Motor-driven valves cost much money, like $10 to $100 each. If about a dozen valves are used, the cost can run from $300 to several thousands of dollars, including installation. And, valves can fail, costing money for repairs and leaving you chilled-to-the-bones until the service man makes the repairs, and hands you the plumber's bill. Then you will get hot. No need to be freightened by plumber's bills when you eliminate most of the potential for trouble by using the present invention.

By use of the present invention, greater efficiency, more free heat from the sun, and lower costs for installation and maintainance. A four-way saving. All so simple, now that you see how it's done.

We claim:

1. A solar heating and auxiliary heating system comprising a solar heat collector to warm a fluid by solar energy, heat storage means to store the solar-produced heat, means to circulate the solar-warmed fluid to the heat storage apparatus, auxiliary heat-producing means for use when stored solar heat is inadequate, a heat exchanger to warm a home or other space to be heated, circulating means to circulate fluid from the heat storage means to the heat exchanger and from the auxiliary heat-producing means to the same heat exchanger to add auxiliary heat to warm the space when heat from the heat storage means is inadequate, and means to switch the circulating means on to circulate warmed fluid from storage when some heat is needed and to switch it off when off is no longer needed, and to switch on the auxiliary heat-producing means and discontinue circulating warmed fluid from storage until the auxiliary heat-producing means meets the heating needs for the space, and to then switch off the auxiliary heat-producing means and to again circulate warmed fluid from storage to the heat exchanger, said means to switch including flow-directing valve means directing flow from storage to the heat exchanger and back to storage in a first mode of operation, or from the auxiliary heat-producing means to the heat exchanger and back to the auxiliary heat-producing means in a second mode of operation.

2. Apparatus as in claim 1, said means to switch including flow-directing valve means directing the flow of fluid from storage to the heat exchanger and back to storage with a first valve closed and a second valve resisting but yielding to flow in that pattern, and directing the flow of fluid from the auxiliary heat-producing means to the heat exchanger and back to the auxiliary heat-producing means with said first valve open and said second valve resisting flow to storage while encouraging flow through the auxiliary heat-producing means.

3. Apparatus as in claim 1, and delay means to delay switching from said second mode of operation to said first mode.

4. Apparatus as in claim 3, said delay means comprising differential thermostat apparatus.

5. Apparatus as in claim 3, said delay means comprising time-delay apparatus.

* * * * *